April 16, 1968 H. M. RICHARDSON ET AL 3,377,657
APPARATUS FOR MOLDING A REINFORCED HOLLOW PLASTIC ARTICLE
Original Filed Dec. 28, 1962
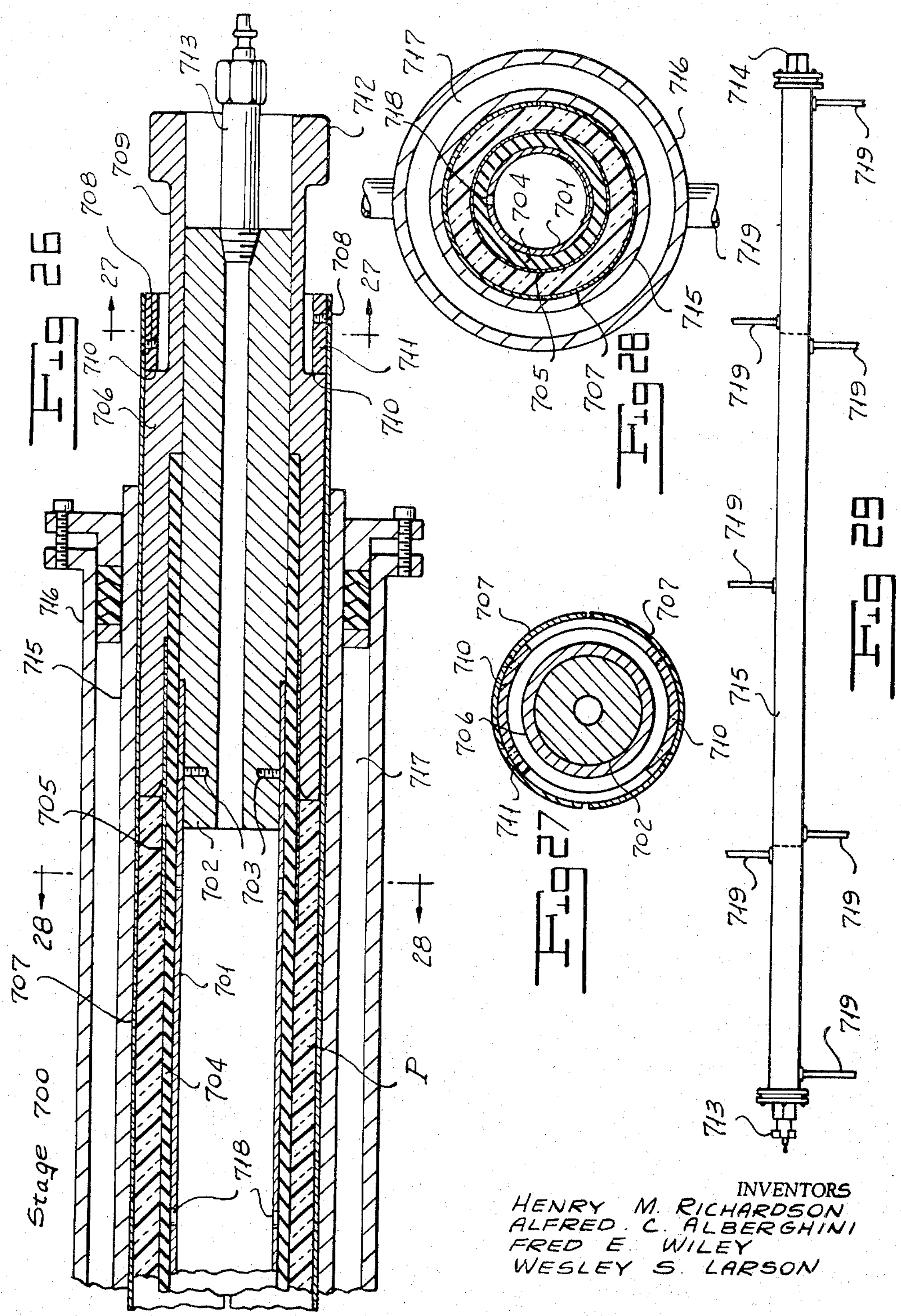

3,377,657

APPARATUS FOR MOLDING A REINFORCED HOLLOW PLASTIC ARTICLE

Henry M. Richardson, Somers, and Alfred C. Alberghini, Hazardville, Conn., Fred E. Wiley, Longmeadow, Mass., and Wesley S. Larson, Hazardville, Conn., assignors to The Youngstown Sheet and Tube Company, Boardman, Ohio, a corporation of Ohio Application Sept. 13, 1965, Ser. No. 486,678, which is a division of application Ser. No. 248,058, Dec. 28, 1962, now Patent No. 3,256,128. Divided and this application Mar. 31, 1967, Ser. No. 627,536
5 Claims. (Cl. 18—19)

ABSTRACT OF THE DISCLOSURE

This patent discloses a mold for plastic pipe having two elongate semi-circular members which embrace the exterior of a preform to be cured. The members are held within an encircling body which provides heat for curing. An internal bladder expands the preform against the two semi-circular members. Gases from the preform escape through the juncture of the semi-circular members and out through the encircling body. For a disclosure of the entire method and apparatus employed in fabricating the pipe, see U.S. Patent 3,256,128 which is incorporated herein by reference.

This is a divisional application of our copending application Ser. No. 486,678 filed Sept. 13, 1965, which was a divisional application of our application Ser. No. 248,058 filed Dec. 28, 1962, now Patent No. 3,256,128.

This invention is an apparatus for making a reinforced hollow plastic article and, while adapted for the fabrication of articles of different kinds and for different uses, is of outstanding utility to the manufacture of pipe formed from wrapped strips and/or tapes of fibrous material in which tapes are incorporated reinforcing glass strands which extend parallel to one another and to the lateral edges of the tapes.

The primary objects of this invention are to produce a non-metallic pipe having an impervious, corrosion-resistant plastic lining encased within resin impregnated fibrous tapes having longitudinal reinforcing strands, with right and left hand wrappings of reinforced tapes under balanced condition and to provide such a pipe by including, in its manufacture, molding and curing steps which stretch or tensilize each layer of the wrappings in turn, so that all of said reinforcing strands are brought to the same degree of tension, with the result that, when internal fluid pressure is applied to the pipe in use, stresses thereon are carried by all reinforcing strands equally.

In carrying out this invention, a mandrel, composed of successive sections, detachably joined end to end, is caused to travel along a predetermined path. As it so travels, there is first applied to the mandrel a helically wound liner. This liner is applied to the mandrel at a first winding station embodying two winding heads arranged to rotate about the mandrel and to supply to the latter a liner consisting of two plies of a suitable corrosion-resistant material, such as unplasticized polyvinyl chloride strips helically wound in the same direction with one ply overlying the other and with the edges of each ply abutting one another, in such manner as to break joints with the abutting edges of the underlying layer.

The first ply of the liner applied to the mandrel has been previously coated on the outside, to contact the second ply, witha thin film of a combination of a phenol resin and an acrylonitrile-butadiene synthetic rubber (Buna-N). This layer of adhesive is previously laid down from an ethyl acetate solution. The solvent is then dried and the adhesive left on the polyvinyl chloride strip surface in such condition that it is substantially non-tacky, but will adhere to itself under pressure.

The second layer of liner strip of the same kind, wound on the mandrel, has a coating of vinyl resin polymer adhesive on its surface which engages with the first layer of vinyl strip. The function of the adhesive film is twofold. Its first function is to act as a pressure sensitive adhesive to hold the two layers of polyvinyl chloride strip in the preform until the latter is subsequently molded, as hereinafter described. Also, during the molding operation, the preform is internally expanded and the adhesive cured and thermoset to form a tenacious bond between the liner layers.

After the linear has been applied to the mandrel as stated, there is next applied over said linear, at successive stations, a plurality of layers or plies of resin impregnated, highly absorbent paper, such as kraft, or asbestos, carrying on its surface parallel laid reinforcing fibers, preferably of glass. This overlay consists of a fibrous web of paper or asbestos fibers in strip form and impregnated with a solution of a curing, thermosetting resin, e.g., phenolic or epoxy resin, combined directly with parallel laid glass fiber strands in the form of a sheet or "beam." In practice this "beam" may consist of from 60 to 120 glass strands per inch of width. The combined strip, comprising the fibrous web with the glass strands laid on it, is then passed through a drying oven and is conditioned to have the proper flow and cure characteristics to produce the end product curved plastic pipe. The reinforced web is then slit to a width such that when it is helically wound on a mandrel with a helix angle, which is determined by the desired distribution of circumferential and longitudinal elongation characteristics of the finished pipe, will wind without overlap and without leaving a gap. Therefore, each individual helical wrap forms a continuous tubular element ply in the wall of the pipe.

The fibrous web to which reference has been made may, if desired, embody asbestos fibers prepared in accordance with the disclosure of United States Patent No. 2,626,213 granted to I. J. Novak, used according to said disclosure or in combination with randomly oriented glass or other fibers.

The process of making the pipe from this prepared and slit tape is one of continuous winding on mandrel sections which are successively detachably coupled to one another and fed in continuous succession through the continuous wrapping machine of this invention. The assembled mandrel sections may be of any desired length, e.g., 20 ft. and they may be of any desired diameter. They are successively coupled together end to end and are fed to and through the machine by a pushing or feeding unit which propels them through several winding stations during the wrapping operations to which reference has been made. At these successive stations, progressive winding strands are constituted to alternately feed the glass reinforced tapes in opposite directions or "hand" and automatic mechanism is provided to maintain each of the tapes at all times under uniform tension so that, even in the finished preform, the tension on all of the tapes is uniform and balanced.

After the preform has been completed on any particular section of mandrel, this preform is severed at a mandrel coupling by rotating knives and said preform, with the mandrel section therein, is moved free from the following mandrels and windings and discharged from the machine. The mandrel section contained in such preform is then removed from the preform and the latter is subjected to a molding, tensioning and curing operation in the presence of sufficient heat to thoroughly cure the resins therein contained and produce a homogeneous construction, with the reinforcing glass fibers of the several layers or plies under a tensilized balanced condition. Maximum circumferential and longitudinal strength of the pipe results. In such a pipe, the pressure of fluids passing through such pipe will be borne equally by all plies or layers of the pipe.

In addition to the foregoing steps of this process, provision may be made for the coupling together of successive lengths of pipe sections to form a continuous conduit in the field or plant where they are installed for use.

Features of this invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative only, and not as defining the limits of the invention.

FIG. 26 is a longitudinal section of one end portion of the molding and curing elements for the preformed pipe.

FIG. 27 is a cross section on the line 27—27 of FIG. 26.

FIG. 28 is a cross section of the line 28—28 of FIG. 26.

FIG. 29 is a side elevation of the mold as it appears when ready to carry out its functions.

In the carrying out of the molding and curing operation on the preform, there is provided a metal tube 701, preferably of aluminum, into each of the open ends of which extends the reduced end of a tube plug 702 to which the tube is secured by a series of flat head screws 703. The tube 701 is provided with perforations 718 as shown. Tube 701 and its associated plugs 702 are next telescoped into an elastic sleeve or bladder 704 which may be of any appropriate elastomer, such, for example, as a silicone or butyl elastomer.

The telescoping of these parts is accomplished in the following manner. As viewed in FIG. 26, the left hand end of the bladder is temporarily closed and, as the tube 701 is introduced into the right hand end of the bladder, air under pressure is applied through a fitting 713 into the interior of the tube 701. During this operation the perforations 718 in the tube are sealed. All of them are sealed at the beginning of the telescoping operation, but they are progressively unsealed in any suitable manner as the tube 701 progressively enters into and proceeds longitudinally into the interior of the bladder, so that there is always a pressure during the introduction operation within the tube 701 and from such interior through the perforations 718 as they are successively unsealed. The pressure which thus passes into the interior of the bladder through the unsealed perforations 718, acts against the interior surface of the bladder to progressively expand longitudinal portions thereof as the tube is entered thereinto and in this manner the telescoping of these parts is efficiently and expeditiously performed. After these parts have been telescoped as stated, the temporary seal at the left hand end of the bladder in FIG. 26 is discontinued so that that end of the bladder is now open. The parts 701 and 702, telescoped as described, are inserted as a unit into the preform P.

A protective sleeve 705 of, for example, nylon, is positioned within the opposite ends of the preform and extends beyond said ends, as shown in FIG. 26. There is next telescoped over the end of each end plug 702, a pull-out element 706, the outer surface of which is flush with the outer surface of the preform.

There is then applied over the assembly a diametrically split sleeve 707, preferably of aluminum. This split sleeve projects beyond the ends of the pull-out element 709 and is provided at each end with internal quadrants 711 held in place by screws 708. Each pull-out element 706 has a reduced portion 709 into which the quadrants 711 project and at one end of each reduced portion is a shoulder 710. The quadrants 711 hold the inner end of the pull-out element in edge abutting relation with the adjacent end of the preform. The outer end of each pull-out element has pull-out lugs 712, the purpose of which will presently be explained. One of the plugs 702 is provided at its outer end with the inlet tube 713, while the corresponding end of the other plug 702 is sealed at 714 (FIG. 29).

After the parts thus far described are assembled as stated, they are introduced into a jacketed mold formed by inner and outer tubes 715 and 716 which are bolted together with appropriate packing to produce an intermediate jacket chamber 717. The inner surface of the mold wall 715 is preferably honed out to a precise bore of the proper diameter, so as to properly support the aluminum tube 707 during the molding and curing operations. The semi-circular tube sections of this aluminum tube are in a sense protectors, the inner surfaces of which are smooth, so as to assure a nice finish on the exterior of the finished pipe. In practice, the inner and outer surfaces of the tube 707 are preferably coated with a release agent, such as Teflon, (tetrafluoroethylene) to preclude adhesion to the adjacent parts against which they bear.

A pipe made according to FIG. 26 will be of uniform outer diameter throughout its length. However, if desired, the inner surface of the split aluminum sleeve 707 may be so formed as to provide a connecting means, such as thread or internal coupling devices, so that, during the subsequent molding operation the same may be molded into the pipe.

The molding of the preform within the mold is accomplished by the introduction of radial pressure against the interior of the preform, with concurrent softening of the resins through the application of heat to such preform. The application of pressure to the interior of the preform is accomplished through the introduction of an appropriate fluid, such as air or nitrogen gas, from the inlet tube 713 into the interior of the tube 701 and through spaced perforations 718 thereof against the inner surface of the elastomer tube or bladder 704 which is thus caused to press against the inner surface of the preform and squeezes it in an outward direction to reorient and consolidate all the parts and render its structure more dense. The application of heat to the preform during this outward radial pressure is accomplished through the feed of hot water and steam through a series of connections 719 arranged longitudinally of the mold, as shown in FIG. 29.

In practice, there is first introduced into the jacket 717 of the mold hot water for the purpose of effecting a preliminary softening of the resins of the preform. The particular temperature of the water employed in this connection will of course vary with the particular resin in the preform. As the pressure is increased within the preform by the feed of fluid through the inlet tube 713, there results an expansion of the interior plies or layers of the preform windings, responsive to such pressures. As this expansion continues, the outside ply meets and conforms to the mold and the inner plies simultaneously expand due to compression of the wall of the preform by the elastomer tube. Any air which may have been trapped between the respective plies is thus expelled and escapes between the edges of the split sleeve 707, so that by the time all of the plies of the preform have been sufficiently heat softened, the wall of the preform will have been thoroughly and appreciably compacted against the mold.

The treatment with water at elevated temperature constitutes a definite step in the carrying out of this method and is in effect a preliminary heating step during which the resins in the preform are sufficiently heated to permit the change of the conditions described. The period involved in this particular step will depend of course upon the particular resin which is involved.

After the preliminary step of resin softening just described, the water employed therein is withdrawn and steam is introduced into the jacketed chamber 717 at progressively timed periods of higher temperatures. Here again the temperatures and periods employed for these progressive heatings will vary with the resins involved. By this modus operandi the resins involved in any case will be liquefied to such extent as to readily flow. In so doing they thoroughly distribute themselves throughout the entire preform so as to render the latter a substantially homogeneous structure.

At the same time this step involving the steam heat application completes the densification of the wall of the preform which was initially commenced during the hot water heating phase.

During this preliminary steam heating the wall of the preform is compacted to its maximum density which is desired in the finished pipe. The remainder of the heating cycle with its inherent higher temperatures cures the resins of the preform, so that the preform may then be reduced to room temperature by cooling the mold in any suitable manner as by circulating a cooling medium through the jacket thereof.

After the pipe has been cured and cooled in the manner described, the interior of the tube 701 is vented to permit the autogenous collapse of the elastomer tube against its outer surface. Appropriate withdrawal means, such as a winch operated cable having a fitting engaged with the lugs 712 at one end of the assembly, may be operated to pull the split sleeve 707 and all parts contained therein from the mold. The sections of the split tube 707 may then be removed, the pull-out elements withdrawn, and the plugs 702 with the protective sleeve 705 and the tube 701 may then be readily withdrawn from the interior of the pipe to leave the pipe unencumbered. The opposite ends of the pipe are thereafter preferably cut off and the pipe thus becomes the end product article of manufacture of this invention, ready for use in the field with whatever type of joints that it may be desired to associate therewith for securing a succession of sections of these pipes to one another.

During the foregoing stages, certain interesting phenomena take place. For example, it has been found that the expansion of the inner plies of the preform progressively shortens said plies in a direction longitudinally of such preform as they are expanded into the ultimate densified conditions of the preform wall. This is due to the fact that the reinforcing glass fibers, which extend longitudinally of the tapes from which the wrappings were formed, have a high strength and high modulus of elasticity and consequently will not stretch, but will be subjected to a tensile load which will cause the successive plies to shorten as they are expanded, by an amount proportional to the expansion of each successive ply, thereby shortening the pitch of the helical path of the reinforcing strands in the same proportion. Thus, as the successive plies are expanded, the pitch of the reinforcing glass helices in said plies decreases, and as it decreases, the ends of the respective plies are drawn toward the longitudinal center of the preform. There results a different helical pitch for the reinforcing glass fibers of the several plies and laminations of the preform and consequently such re-arrangement of the helices throughout the preform as to produce maximum radial strength in the end product. By virtue of this lonigtudinal shortening of the successive plies, there results a tapering of the wall thickness at the opposite ends of the preform which is substantially proportional to the increase in diameter of each successive ply.

In the end product pipe of this invention, the tension in all of the reinforcing strands of the pipe approaches zero, but said strands are still under some slight tension. The important feature of the pipe of this invention is that the tension in all of the reinforcing strands of all of the plies is the same, due to their ability, during the molding operation, to modify the helical pitch in order to accomplish this end. Consequently, when internal stress is applied to the pipe in use, as by fluid pressure passing therethrough, it is applied equally to all of the reinforcing strands of such pipe, a characteristic which has heretofore been unknown in wrapped, compacted reinforced pipe.

During the molding and curing operations the liner adapts itself to increased internal diameter of the superimposed glass reinforced tapes and becomes a homogeneous part of the end product pipe.

As hereinbefore pointed out, the curing of the preform to produce the finished pipe wall in some cases involves different temperatures, pressures, and periods of time of the several steps, depending upon the particular binders used in the formation of the preform. However, the following examples are given as illustrative of practice which we have carried out and which have given excellent results.

EXAMPLE I

*Curing of epoxy resin impregnated pipe*

STEP 1

Admit circulating water at approximately 180° F. to the mold jacket and simultaneously start to gradually internally pressurize the bladder. The circulation of water is continued for approximately 6 minutes.

STEP 2

Admit steam under 20 p.s.i.g. to the jacket for approximately 3 minutes while simultaneously withdrawing the circulating water referred to in Step 1.

After the pressurizing of the bladder has continued to produce an internal pressure of approximately 350 p.s.i.g., further pressurizing is discontinued and this pressure is held for the remainder of the curing cycle.

STEP 3

Admit steam pressure into the jacket at 40 p.s.i.g. for approximately 3 minutes.

STEP 4

Admit steam at 120 p.s.i.g. into the jacket for approximately 17 minutes.

STEP 5

Admit cooling water into the jacket for approximately 5 minutes.

STEP 6

Vent the bladder to the atmosphere.

STEP 7

Remove the resulting cured pipe from the mold.

EXAMPLE II

*Curing of phenolic resin impregnated pipe*

STEP 1

Admit circulating water at approximately 180° F. to the mold jacket and simultaneously start to gradually internally pressurize the bladder. The circulation of water is continued for approximately 6 minutes.

STEP 2

Admit steam under 13 p.s.i.g. to the jacket for approximately 6 minutes while simultaneously withdrawing the circulating water referred to in Step 1.

After the pressurizing of the bladder has continued to produce an internal pressure of approximately 350 p.s.i.g., further pressurizing is discontinued and this pressure is held for the remainder of the curing cycle.

STEP 3

Admit steam pressure into the jacket at 55 p.s.i.g. for approximately 10 minutes.

STEP 4

Admit steam at 120 p.s.i.g. into the jacket for approximately 15 minutes.

STEP 5

Admit cooling water into the jacket for approximately 5 minutes.

STEP 6

Vent the bladder to the atmosphere.

STEP 7

Remove the resulting cured pipe from the mold.

The foregoing detailed description sets forth the invention in its preferred practical forms, but the invention is to be understood as fully commensurate with the appended claims.

What we claim is:

1. Apparatus for use in manufacturing fiber reinforced tubular structures comprising:

a mold, a radially expansible sleeve fitted into said mold having an outer diameter substantially less than the inner diameter of said mold, said sleeve being dimensioned to fit around a preform of said tubular structure, means for introducing pressure into said preform sufficient to expand said sleeve into surface-to-surface contact with the mold, means for heating the mold, and means for controlling the temperature within said mold.

2. Apparatus as set forth in claim 1 in which said expansible sleeve comprises semi-cylindrical members having a coefficient of expansion different from the material of which the mold is formed.

3. Apparatus as set forth in claim 2 in which said semi-cylindrical members are aluminum and in which the pressure applying means comprises a perforated tubular member having an elastic sleeve fitted therearound.

4. A mold comprising:

a pair of elongate members having semi-circular surfaces which when confronting each other provide a cylindrical mold cavity, means entirely surrounding said members and providing for heating of said surfaces and for holding said members in confronting position, said members having confronting surfaces on opposite sides of said semi-circular surfaces providing means in communication with the juncture of said confronting surfaces through which gas can escape, and pressure means for expanding a preform in said mold cavity into engagement with said mold cavity and compacting said preform and driving gas in said preform and mold cavity through said juncture between said surfaces.

5. A mold comprising:

a pair of elongate members having semi-circular surfaces which when confronting each other provide a cylindrical mold cavity, means entirely surrounding said members and providing for heating of said surfaces and for holding said members in confronting position, said members having confronting surfaces on opposite sides of said semi-circular surfaces providing means in communication with the juncture of said confronting surfaces through which gas can escape, a radially expansible cylindrical bladder insertable in said mold cavity, and means for pressurizing said bladder to expand a preform surrounding said bladder into engagement with said mold cavity and compact said preform and drive gas in said preform and mold cavity through said means providing for escape of gas.

References Cited

UNITED STATES PATENTS

| | | | |
|---|---|---|---|
| 1,076,229 | 10/1913 | Priest | 249—112 |
| 1,226,470 | 5/1917 | Coolidge. | |
| 1,846,279 | 2/1932 | Speirs. | |
| 2,401,728 | 6/1946 | Gillette et al. | |
| 2,741,007 | 4/1956 | Locatelli. | |
| 2,865,078 | 12/1958 | Hasselblad. | |
| 2,977,269 | 3/1961 | Nerwick. | |
| 2,999,272 | 9/1961 | Warnken. | |
| 3,039,140 | 6/1962 | Andrews. | |
| 3,137,898 | 6/1964 | Geringer. | |
| 3,158,907 | 12/1964 | Pavicevic. | |
| 3,162,895 | 12/1964 | Pusch. | |
| 3,258,384 | 6/1966 | Scott. | |
| 3,290,728 | 12/1966 | Pratt. | |

J. HOWARD FLINT, Jr., *Primary Examiner.*